April 25, 1944.   J. A. CSEPELY   2,347,400
FURNACE FOR HEAT TREATING METAL ARTICLES
Filed Oct. 5, 1942   2 Sheets-Sheet 1

Inventor
John A. Csepely
By Rockwell & Bartholow
Attorneys

April 25, 1944.  J. A. CSEPELY  2,347,400
FURNACE FOR HEAT TREATING METAL ARTICLES
Filed Oct. 5, 1942   2 Sheets-Sheet 2

Inventor
John A. Csepely.
By Rockwell & Bartholow
Attorneys

Patented Apr. 25, 1944

2,347,400

UNITED STATES PATENT OFFICE 2,347,400

FURNACE FOR HEAT TREATING METAL ARTICLES

John A. Csepely, New Haven, Conn., assignor to Artemas F. Holden, Northford, Conn.

Application October 5, 1942, Serial No. 460,803

6 Claims. (Cl. 13—24)

This invention relates to furnaces for heat treating metal articles, and it has particular reference to furnaces where, for hardening or carburizing articles of steel and the like, the articles are immersed in a salt bath raised to a relatively high temperature, say, between 1450° F. and 2350° F. The invention also has reference to a furnace of this type, in which the saline bath is heated by the passage through it of electric current traversing electrodes extended into the bath.

One of the objects of the invention is to provide a furnace in which the heat is very effectively distributed through the bath, which may be contained, for example, in a pot of rectangular shape, and in which a circulation of the bath, which will prevent substantial cooling or freezing in corner portions or pockets, will be maintained through the supply of electric current by way of the electrodes.

Another object is to provide a heat treating liquid bath furnace in which there is not only a better distribution of heat, but one in which there is more heat treating space in the pot than has hitherto been generally available in furnaces employing three electrodes.

Another object is to provide an improved heat treating furnace of the salt bath type, in which the heating effect is produced by three-phase current.

Another object is to provide a furnace of this type, in which the wearing effect upon the electrodes is substantially uniform.

To these and other ends, the invention consists in the novel features and combinations of parts to be hereinafter described and finally pointed out in the claims.

Figure 1:
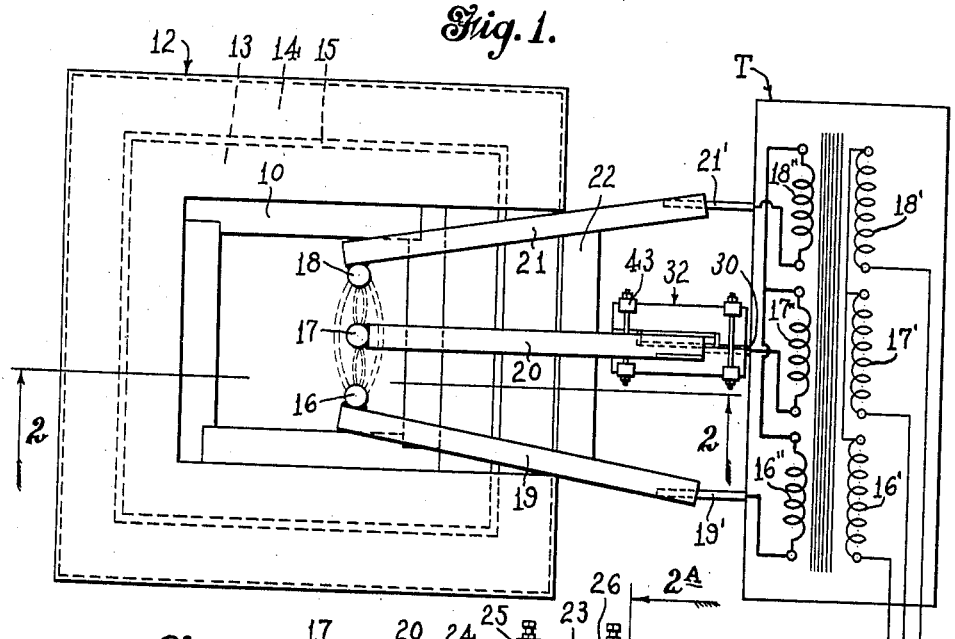
Fig. 1 is a top plan view of a salt bath heat treating furnace embodying my invention, the transformer portion of the supply circuit being shown diagrammatically, and the clamps for the electrode bars being omitted in this particular view for the sake of clearness.

Furnaces for the heat treatment of steel in hardening and carburizing operations, where the steel articles have been immersed in a salt bath brought to a relatively high temperature by the use of electrodes extended into the bath, have been used previously, but in such furnaces there have been substantial problems presented in respect to efficiency, uniform heating effect upon the salt bath, availability of working space in the bath, etc., and these problems have not been satisfactorily solved in three-phase furnaces.

In the furnace shown in the drawings, embodying my invention, a pot 10 of substantially rectangular cross section and constructed of suitable refractory material is adapted to hold the salt bath 11. This pot is set in a furnace body of appropriate structure, such as generally indicated at 12, provided with a relatively thick wall of heat insulating material which, in this instance, is composed of inner and outer layers 13 and 14 separated by a cup-shaped metal element or inner shell 15. The outer metallic shell of the furnace is indicated at 12a. This furnace is operated by three-phase current, and there are three electrodes by means of which the bath is heated, these electrodes being indicated respectively at 16, 17 and 18. These electrodes are usually of a nickel alloy having high resistance to corrosion, and they are preferably formed as round rods attached by suitable means, as by welding, to the ends of metal supporting bars 19, 20 and 21, respectively, extended over one of the side walls of the furnace structure, in the manner shown in Figs. 1 and 2.

Figure 2:
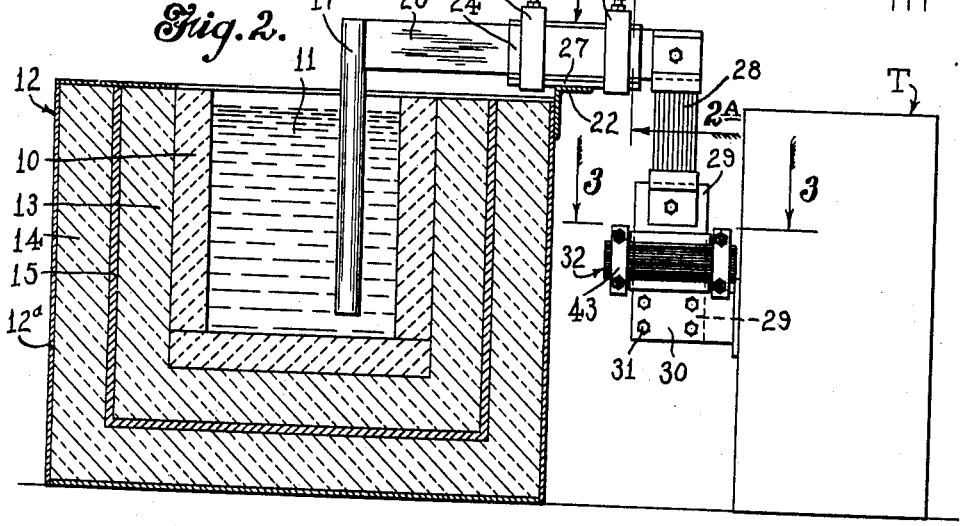
Fig. 2 is a section of the furnace on line 2—2 of Fig. 1 showing the mounting of the central bar.
Figure 2A:
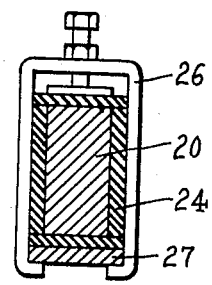
Fig. 2A is a detail section taken on line 2A—2A of Fig. 2.

The supporting bars 19, 20 and 21 are preferably constructed of wrought iron or steel, and each is suitably insulated from the underlying furnace structure by which it is supported. A typical method of support is shown in Figs. 2 and 2A, where 22 is an angle bar secured to the metal shell 12a in such a manner as to project upward therefrom to some extent and to underlie an insulating mounting of bar 20. This insulating mounting, indicated generally at 23 (Fig. 2), may comprise insulating plates 24 located at the respective faces of the bar, so as to enclose the same, and held in place on the bar by clamps 25 and 26, the lowermost plate 24 resting upon a metal plate 27 which, in turn, is supported on the lower separated extremities of the clamps 25 and 26, in the manner shown in Fig. 2A. The plate 27 is welded to the angle bar 22.

The electrode bars 19, 20 and 21 are connected to the transformer T supplying the heating current, and in the form of apparatus shown in Figs. 1 and 2, the transformer, which is supplied with three-phase current, has primary coils 16', 17' and 18' connected in star arrangement, and corresponding secondary coils 16″, 17″ and 18″ also in star arrangement. The electrode bars are connected respectively to the ends of the star-arranged secondary coils, the bars 19 and 21 having connections including members 19′ and 21′ which may be of any preferred construction, and the connection between middle bar 20 and its coil being preferably of the kind shown in Fig. 2. In that view, the butt end of the bar 20 is connected by means of a flexible cable connector 28 to a bus bar 29 fastened at its lower end to a transformer lug 30. The transformer lug 30 is the one which is connected to the secondary coil 17″. The bus bar 29 is bolted to the lug by bolts 31 and, in the instance shown, the bus bar is directed upwardly from the lug. Just above the lug, an external reactance is provided in connection with the bar, as generally indicated at 32. This reactance comprises, preferably, as shown, a plurality of steel plates or laminations, the laminations being set over the bar so as to lie at right angles thereto and being clamped together with the aid of fastening bolts in order to provide a laminated reactance body in embracing relation to the bar.

Figure 3:
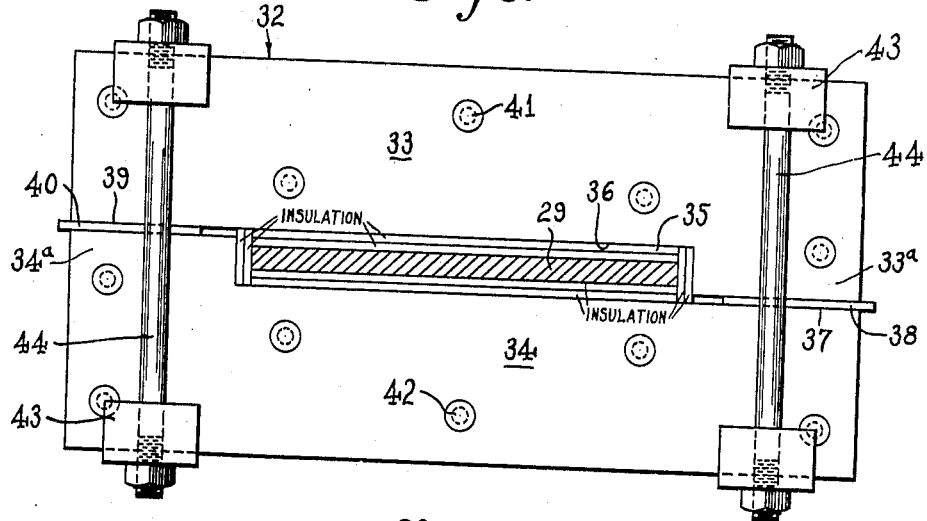
Fig. 3 is a section on line 3—3 of Fig. 2.

In the preferred form illustrated in the drawings, where the laminations are horizontally arranged, rectangular lamination members are separated in vertical planes, as shown in Fig. 3, so as to provide a section 33 arranged, generally speaking, at one side of the bus bar, and a similar section 34 arranged, generally speaking, at the opposite side of the bar. To accomplish this, each section is approximately L-shaped, section 33 having a short leg 33a at one end and section 34 having a corresponding short leg 34a. The bus bar 29, with suitable insulating means 35 placed around it, is located in the recess 36 formed by nesting together the sections 33 and 34, in the manner shown in Fig. 3. Moreover, it will be noted that between the body of section 34 and the leg 33a, a space 37 is left to create an air gap, this space being preferably filled by suitable inert material 38, and a similar air-gap-providing space 39 preferably filled with inert material 40 is provided at the other end of the plate structure. All of the sections or plates 33 are preferably riveted together by rivets 41 into a block, and all of the plates 34 are riveted together by rivets 42.

For removably clamping the block of plates 33 and the block of plates 34 in the desired spacing to provide the desired air gap, a pair of U-clamps 43, interconnected by bolts 44 lying respectively above and below the block, is employed at one end of the structure, and similar clamping provisions are employed at the opposite end.

It will be observed that the electrodes 16, 17 and 18 are arranged substantially in line transversely of the furnace structure, so as to lie in a transverse vertical plane about two inches away from the right-hand wall (Fig. 1) of the pot. This particular relation need not exist in all cases, for the lateral dimension of the pot might be somewhat greater than that shown, but in all cases, the electrodes should be substantially spaced by approximately the diameter or thickness of the electrode from what is shown in Fig. 1 as the right-hand wall, it being difficult to secure effective results if this spacing is insufficient. It will also be noted that the electrodes 16 and 18, which are at the ends of the series, are substantially spaced from the electrode 17, this spacing in the case illustrated being slightly greater than the spacing of 16 and 18 from the pot walls which, in this case, are shown at the upper and lower parts of Fig. 1. It will also be observed that whereas the bar or shank 20 of the central electrode is substantially perpendicular to the right-hand wall, this is not true in respect to the shanks 19 and 21. These latter shanks or bars are extended at an angle across the corner portions of the pot, being arranged at a small angle to bar 20. This provides what may be termed a "fanned-out" arrangement of the shanks, and such an arrangement, in which the end bars are out of parallelism with the central bar, is of substantial value in reducing losses through eddy currents and hysteresis. The average spacing between electrode shanks is increased by this means, thereby reducing hysteresis and eddy current losses.

With an electrode arrangement such as shown, where all of the electrodes are in a common plane or substantially so, currents are set up in the salt bath between each electrode and the other two. The central or middle electrode, as a result of its position, is under ordinary conditions subjected to greater wear than the other two, because more current is drawn by it. By equalizing currents in all three electrodes substantially equal wear results. It is for this reason that the reactance 32 is employed, the result being that when its phase is active, the current supplied to it is reduced in comparison to that supplied to the other two electrodes. By thus throwing the electrode shanks and the electrodes out of inductive balance to a degree, the current traversing the central electrode is cut down sufficiently to equalize the wear on the electrodes. Therefore, it is unnecessary to adjust or replace the central electrode more frequently than the others. On the other hand, it is possible to reach this result with a very small power loss.

When the furnace is in operation with three-phase current of, say, sixty cycles, current is passed to the electrodes with the phases spaced apart at 120° and the maximum positive current passes successively from each electrode to the other two. The result of the alternating excitation is that alternating currents are set up in overlapping relation in the bath itself in the spaces between each electrode and the other two, these current paths owing to the planar disposition of the electrodes being, theoretically, disposed in and about a common plane. However, it is to be noted that the effect of the current flowing through each electrode in a vertical direction is to create a magnetic field surrounding the electrode, which has some effect in deflecting the current path in the bath from its theoretical plane. Moreover, there are also certain inductive effects in the bath itself arising from the passage of current through the liquid. In any event, the current paths in the bath are in practice substantially bowed out, in a manner suggested by the dotted lines in Fig. 1, whereby the current is directed in a bowed or curved path toward the right-hand pot wall (Fig. 1) and is directed in a similar bowed or curved path at the other side of the electrode plane. The result of setting up these current paths obviously is to provide corresponding paths around which the liquid of the bath will tend to circulate, the intensity of circulation being a function of the intensity of the current flowing through the bath. This circulation occurs throughout the length of the electrodes and is very effective in transferring heat to all portions of the pot and preventing cooling or freezing of the liquid in the corners. The extra wear to which the central electrode would be subject under ordinary conditions is due to the fact that the current paths between it and the respective electrodes 16 and 18 are much shorter than the path or paths between 16 and 18. This is compensated for, however, in the present furnace by the provision of the reactance in association with the central electrode.

Another advantage of the improved furnace is that the pot space to the left of the electrode plane (Fig. 1) is in its entirety available for the treatment of metal articles. This is a very desirable feature, especially as a frequent practice is to place the articles in an openwork basket or the like and introduce the basket into the pot, and with the construction described there is ample space for a basket or baskets.

A reactance of the structure previously described can be readily and inexpensively provided and conveniently applied to the bus bar in the interval between the butt end of the electrode and the transformer. The laminated steel body extending around the bus bar produces a lag in the current flowing through the bar. The electric current retarded or choked in this way changes the phase relationships between the several electrodes in such a manner as to reduce the current in the middle electrode to substantial equality with the currents in the outer electrodes. Air gaps are provided in the reactance to improve the choking effect by reducing the danger of magnetic saturation. The construction is such that if a given air gap is found to be too large or too small, adjustment can readily be made.

Figure 4:
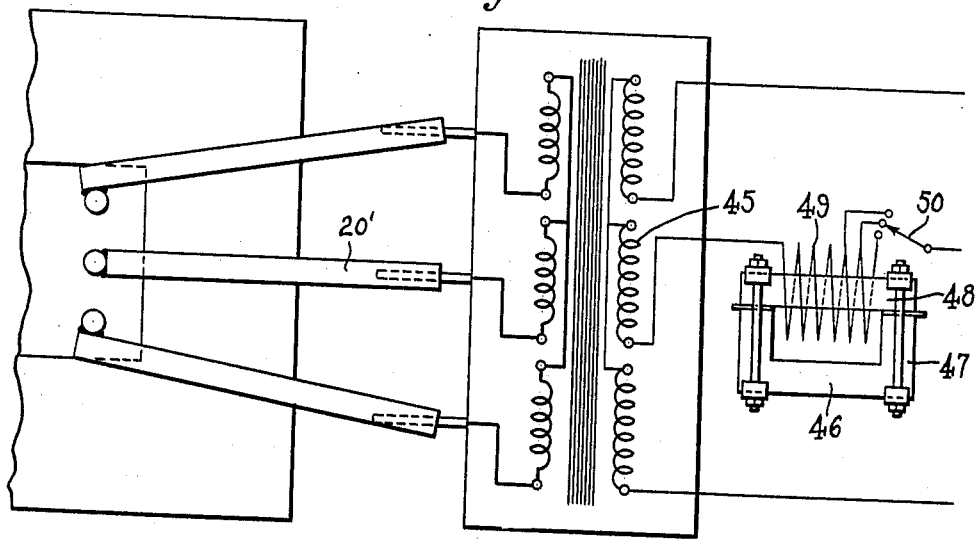
Fig. 4 is a somewhat diagrammatic plan view of a furnace in which the current supply means are of modified form.

In the modified form of structure shown in Fig. 4, the reactance, instead of being associated with the transformer secondary, is associated with the primary. In this case, the reactance appurtenant to the central electrode shank 20' is on the incoming side of the central primary coil 45 and comprises a body 46 of laminated iron having a U-shaped section 47 and a bridge portion 48. Around the bridge portion 48 is disposed a winding 49 connected to the primary coil 45. The portion of the winding 40 which is traversed by the incoming current is adjustable by means of an adjusting arm 50. This is a further arrangement permitting the current passing to the central electrode to be reduced to a regulable degree in order to equalize the wear on the electrodes.

While I have shown and described two embodiments of my invention, it is to be understood that the invention can take other forms and that various modifications may be made in the organization of parts and in the details without departing from the principles of the invention or the scope of the claims. For example, I may use six, nine or twelve electrodes, or other multiples of three, each set of three electrodes being equipped with a suitable reactor associated with the middle electrode of the group.

What I claim is:

1. A furnace for the heat treatment of metal articles, comprising a receptacle, a liquid treating medium in said receptacle in which the articles are adapted to be immersed and which conducts a heating current, three spaced electrodes in substantially planar arrangement set transversely of the receptacle and extended into the liquid, lateral conducting bars or shanks connected to said electrodes and having a fanned-out arrangement for reducing the effects of eddy currents and hysteresis, and means connected to said bars for supplying said electrodes with alternating three-phase current.

2. A furnace for the heat treatment of metal articles, comprising a receptacle, a liquid treating medium in said receptacle in which the articles are adapted to be immersed and which conducts a heating current, three spaced electrodes in substantially planar arrangement set transversely of the receptacle and extended into the liquid, lateral conducting bars or shanks connected to said electrodes and having a fanned-out arrangement for reducing the effects of eddy currents and hysteresis, means connected to said bars for supplying said electrodes with alternating three-phase current, and means comprising a magnetizable reactance body interposed in the current-supply connection to the bar of the middle electrode whereby the current supplied to the middle electrode is reduced relatively to the other two electrodes.

3. A furnace for the heat treatment of metal articles, comprising a receptacle, a liquid treating medium in said receptacle in which the articles are adapted to be immersed and which conducts a heating current, three spaced electrodes in substantially planar arrangement set transversely of the receptacle and extended into the liquid, lateral conducting bars or shanks connected to said electrodes and having a fanned-out arrangement for reducing the effects of eddy currents and hysteresis, means connected to said bars for supplying said electrodes with alternating three-phase current, and means comprising a magnetizable reactance body interposed in the current-supply connection to the bar of the middle electrode whereby the current supplied to the middle electrode is reduced relatively to the other two electrodes, said middle electrode having a bus bar in its supply connections and said reactance body being in embracing relation to said bus bar.

4. A furnace for the heat treatment of metal articles, comprising a rectangular receptacle, a liquid treating medium in said receptacle in which the articles are immersed adapted to carry heating current, three liquid immersed electrodes in substantially planar arrangement transversely of the receptacle between a center plane and one of the side walls, conductor bars in fan-like arrangement extended from said electrodes across the furnace wall which is in closest proximity to the group of electrodes, and supply means for three-phase alternating current connected to said conductor bars.

5. A salt bath furnace comprising a pot, a charge of salts therein, three electrodes extended into the pot and adapted when traversed by current to maintain the salts in fused condition for immersion therein of articles to be treated, a supply of three-phase alternating heating current comprising a transformer having three secondary terminals individually connected to said electrodes, one of said electrodes being arranged between the other two in a position where it has a tendency to carry increased current, and means comprising a magnetizable reactance body associated with the connection between said electrode and the transformer secondary for reducing the current supply to said electrode to an extent such that the three electrodes carry substantially equal heating currents.

6. A salt bath furnace comprising a pot, a charge of salts therein, three electrodes extended into the pot and adapted when traversed by current to maintain the salts in fused condition for immersion therein of articles to be treated, a supply of three-phase alternating heating current comprising a transformer having three secondary terminals individually connected to said electrodes, one of said electrodes being arranged between the other two in a position where it has a tendency to carry increased current, and means comprising a magnetizable reactance body associated with one of the three power supply leads to the transformer primary for reducing the current supply to said electrode to an extent substantially to overcome the above mentioned tendency.

JOHN A. CSEPELY.